United States Patent

Kawaguchi et al.

[11] Patent Number: 4,641,731
[45] Date of Patent: Feb. 10, 1987

[54] DISC BRAKE FOR MOTORCYCLES

[75] Inventors: Takeshi Kawaguchi, Saitama; Tsuguya Suzuki, Tokyo; Katsuhiro Shibata, Saitama, all of Japan

[73] Assignee: Honda Giken Kogyo Kabushiki Kaisha, Tokyo, Japan

[21] Appl. No.: 857,389

[22] Filed: Apr. 21, 1986

Related U.S. Application Data

[63] Continuation of Ser. No. 441,911, Nov. 15, 1982, abandoned.

[30] Foreign Application Priority Data

Nov. 13, 1981 [JP] Japan ............................. 56-181096

[51] Int. Cl.[4] ............................................. F16D 65/12
[52] U.S. Cl. ............................ 188/218 XL; 188/18 A; 188/71.6; 188/264 AA; 192/70.19; 192/107 R
[58] Field of Search ............... 188/71.6, 73.2, 218 XL, 188/218 A, 18 A, 264 A, 264 AA; 192/107 R, 70.19, 70.2

[56] References Cited

U.S. PATENT DOCUMENTS

| | | | |
|---|---|---|---|
| 2,655,236 | 10/1953 | Bachman | 188/71.6 X |
| 2,753,959 | 7/1956 | Johnson | 188/218 XL |
| 3,729,067 | 4/1973 | Buyze | 188/218 XL |
| 3,807,534 | 4/1974 | Eldred | 188/218 XL X |
| 3,927,740 | 12/1975 | Zarenbka | 188/218 XL |
| 3,939,946 | 2/1976 | Pierre et al. | 188/218 XL |
| 4,132,294 | 1/1979 | Poli | 188/218 XL |
| 4,456,099 | 6/1984 | Kawaguchi | 188/264 A X |

FOREIGN PATENT DOCUMENTS

| | | | |
|---|---|---|---|
| 1625827 | 9/1974 | Fed. Rep. of Germany | 188/218 XL |
| 2093949 | 9/1982 | United Kingdom | 188/218 XL |

Primary Examiner—George E. A. Halvosa
Attorney, Agent, or Firm—Lyon & Lyon

[57] ABSTRACT

A disc brake assembly for the front or rear wheel of a motorcycle including a brake disc having pairs of projections located on its periphery at 120° intervals. The pairs of projections may be placed on either the outer periphery or the inner periphery of the brake disc. The projections define open ended recesses receiving bosses formed integrally with the wheel hub, and partially surrounded by hardened retainers and structural members. A bolt threaded into each boss prevents disassembly of the bosses and recesses but is not subjected to forces caused by thermal expansion of the brake disc during braking. One or more hydraulically activated stationary calipers clamp non-rotary brake pads frictionally against opposite faces of each brake disc. Provisions are made for cooling the brake disc by atmospheric air.

6 Claims, 5 Drawing Figures

DISC BRAKE FOR MOTORCYCLES

This application is a continuation of application Ser. No. 441,911, filed Nov. 15, 1982, now abandoned.

The field of the present invention is disc brakes for motorcycles and is particularly directed to constructions employing a brake disc having pairs of projections located on its inner or outer periphery at equiangular intervals. The projections define open ended recesses into which bosses extend which are formed integrally with the wheel hub. This construction uses a bolt threaded into each boss preventing disassembly but the bolt is not subjected to forces caused by thermal expansion of the brake disc. High accuracy of fitting is achieved with easy machining techniques. A hardened retainer partially surrounds each boss and the retainer may be of a type to develop spring force to prevent unwanted shifting of the parts. The brake disc which rotates with the wheel hub is constructed of annular plates with integral air cooling vanes between them. The vanes serve to circulate atmospheric air through the interior of the brake disc as well as to create a flow of heated air back to the atmosphere.

In the present invention, the vanes are arranged to provide solid structure around each open ended recess. This construction adds to the overall torque transmitting ability of the brake system. Other and more detailed objects and advantages will appear hereinafter.

Figure 2:
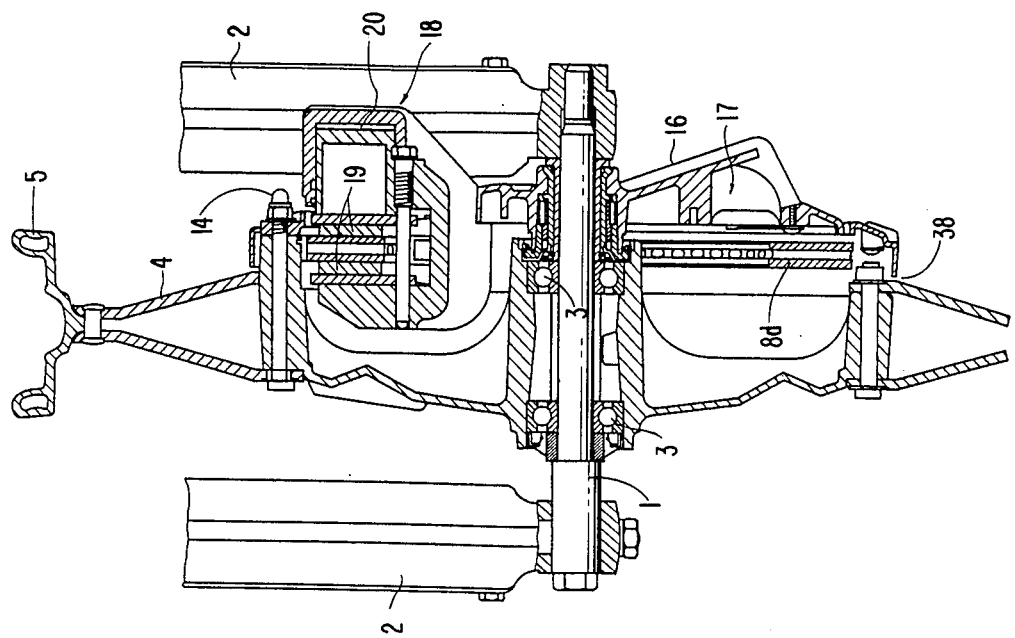
FIG. 2 is a sectional view taken substantially on lines 2—2 as shown on FIG. 1.
Figure 1:
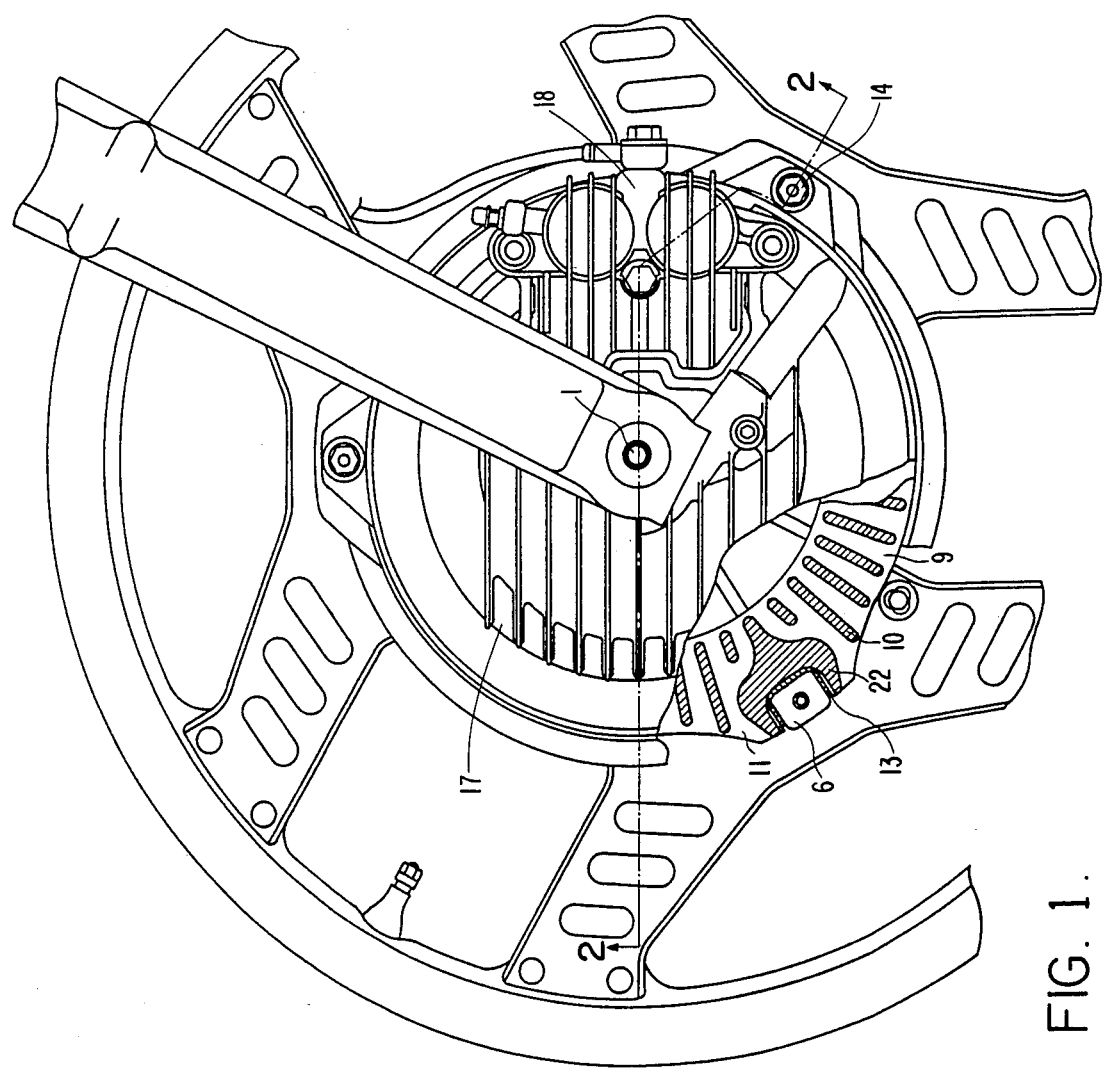
FIG. 1 is a side elevation partly in section and partly broken away.
Figure 3:
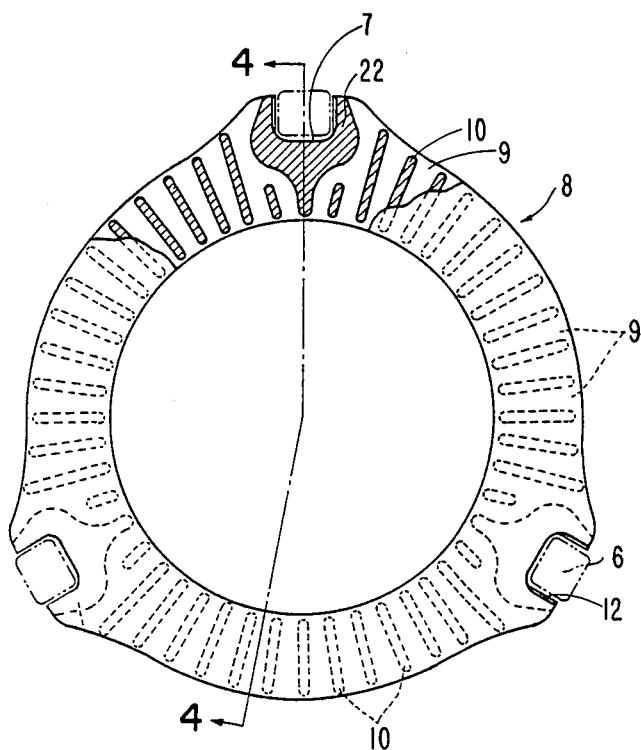
FIG. 3 is a side elevation partly in section showing a brake disc of the type shown in FIGS. 1 and 2.
Figure 4:
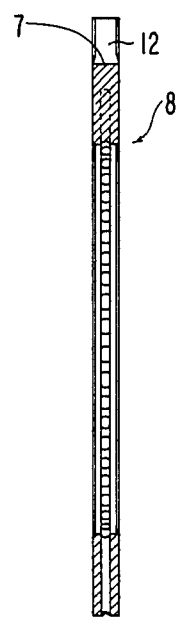
FIG. 4 is a sectional view taken substantially on the lines 4—4 as shown on FIG. 3.

Referring to FIGS. 1-5, the front wheel axle 1 is secured to front forks 2 at both ends, and the front wheel hub 4 is rotatably supported on said axle 1 by means of axially spaced bearings 3. The rim 5 is fixed to and becomes a part of the wheel hub 4. Laterally projecting bosses 6 are formed integrally on the hub 4, and are positioned at intervals of 120° around the periphery of the brake disc 8. Paired projections 11 on the hub 4 project radially therefrom and define recesses 7 which open radially outward and which hold each boss 6 through a retainer 13.

The three double projections 11 of the brake disc 8 have open ended recesses 7 defined between parallel walls 12. The walls 12 are parallel to the radial line extending from the axis of the brake disc 8. The double projections 11 removably engage the mounting bosses 6 and retainers 13 by relative axial movement of the brake disc 8. Axially extending bolts 14 secure the covers 15 to the bosses 6.

A stationary side panel 16 is provided with a cooling air introduction port 17 and a stationary caliper 18 is fixed with respect to the side panel 16. Stationary brake pads 19 engage opposite sides of the brake disc 8. Energizing of the caliper pistons 20 causes the pads 19 to be brought into pressure contact with both sides of the brake disc 8.

When the mounting bosses 6 are engaged with the recesses 7 and defined in the double projections 11, no forced engagement on forced fitting is necessary even if mutual pitch errors are relatively large between the three mounting bosses and the three recesses 7. Even though the brake disc 8 expands in the radial direction due to heat of friction or contracts as a result of cooling, the torque transmitting surfaces of the mounting boss 6 and walls 12 of the recess 7, expansion or contraction is not limited by the mounting bosses 6, and generation of thermal stresses may be reduced to a minimum for improved strength.

The brake disc 8 is formed with a plurality of radial ribs 10 which define cooling air passages 9 between them. Cooling air introduced through port 17 in the side panel 16 is exhausted to atmosphere through the cooling air passages 9 by virtue of centrifugal force, so that heat of friction generated on the brake disc 8 during braking action is dissipated by the air to achieve considerable cooling effect.

Adjacent the recesses 7 internally of the brake disc 8 the ribs 10 are formed into solid members 22 each having a corresponding recess to that of the brake disc. The solid members 22 are continuous around each recess 7 include portions on each side of the recess 7 wider than any radial rib 10, and employ a smooth form about the periphery thereof to enhance air flow. Thus added strength is obtained without requiring increased brake disc width or size.

Figure 5:
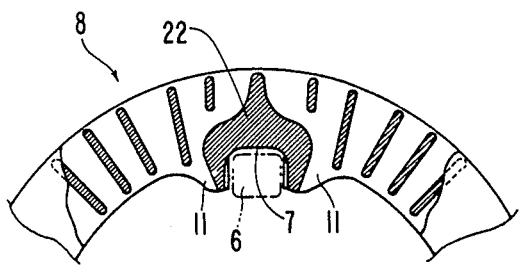
FIG. 5 is a sectional detail showing modification.

The device of FIG. 5 illustrates a similar arrangement employing the present invention but having the recess 7 on the inside.

Having fully described my invention, it is to be understood that I am not to be limited to the details herein set forth, but that my invention is of the full scope of the appended claims.

What is claimed is:

1. A motorcycle including a front wheel with a brake comprising
    a hub in the wheel having equally spaced bosses projecting from the side of said hub, each of said bosses having two sides parallel to a radial line of said wheel;
    a brake disc mounted on said hub including
    spaced parallel plates, and
    a plurality of radial ribs connecting said plates, said plates defining radially extending cooling passages therebetween;
    pairs of aligned projections at the outer periphery of said spaced plates forming a recess therebetween, said recess having two sides parallel to a radial line of said disc;
    a solid member positioned between said plates at each pair of projections, said solid member formed as a rib having an enlarged rib end portion forming a wall continuously about said recess, said solid member including portions on each side of said recess wider than any said radial rib; and
    a cover at the end of each boss to support said disc in an axial position against said hub, said cover offering no resistance to radial movement of said disc, said disc mounted on said hub with each of said recesses engaging a boss, said sides of said recess slidably engaging said sides of said boss for radial heat expansion movement of said disc.

2. The motorcycle of claim 1 wherein said radial projections extend radially outwardly from said plates.

3. The motorcycle of claim 1 wherein said radial projections extend radially inwardly from said plates.

4. The motorcycle of claim 1 wherein said solid members have a smooth outer periphery and a continuous rib section at the opposite side of a recess.

5. The motorcycle of claim 1 wherein said solid members are formed integral with said spaced parallel plates at said pairs of radial projections.

6. The motorcycle defined in claim 1 wherein said solid member tapers from said enlarged rib end to a single rib end for defining said radially extending air passages.

* * * * *